Figure 1:
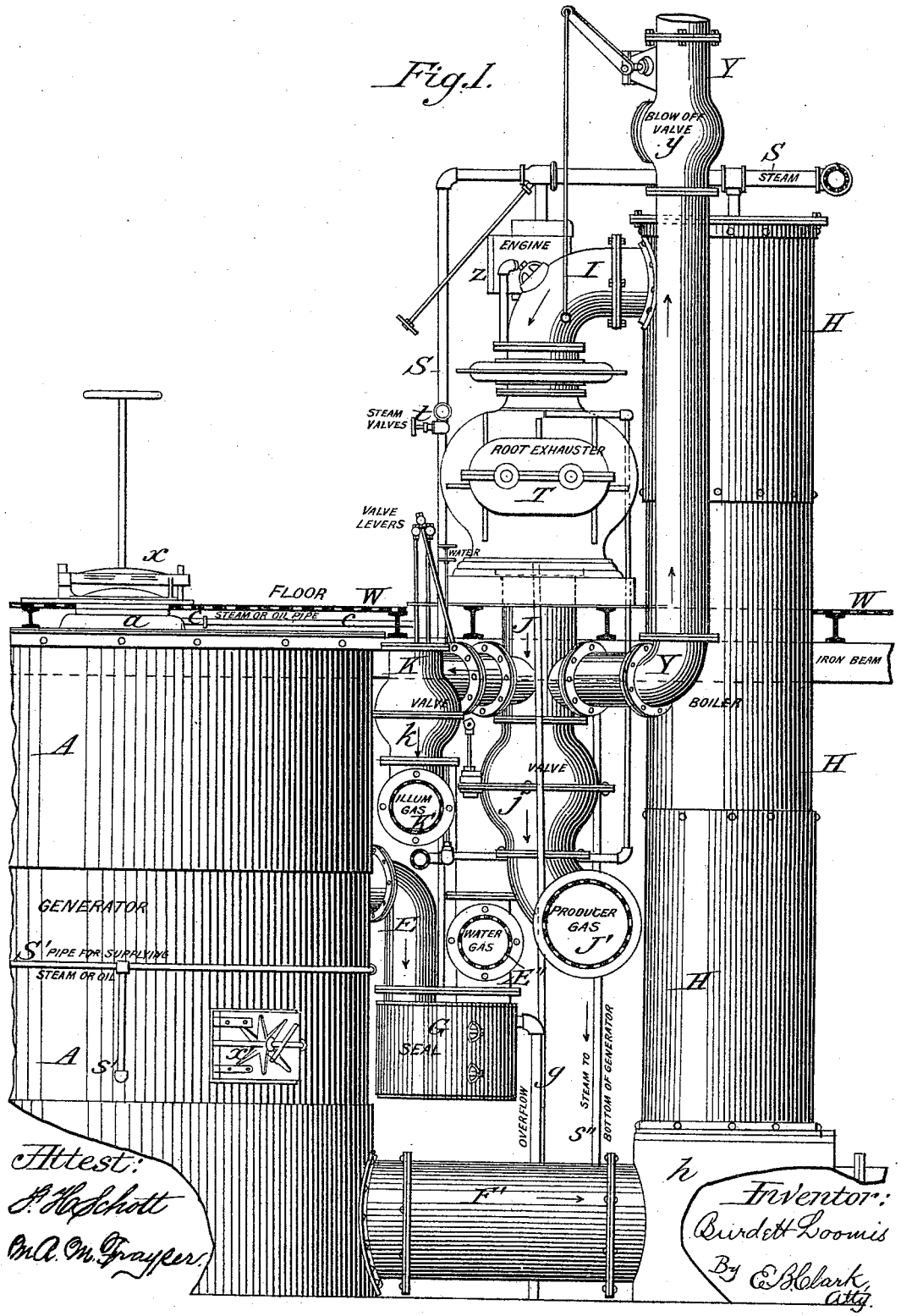

(No Model.) 2 Sheets—Sheet 1.

B. LOOMIS.
PROCESS OF AND APPARATUS FOR THE MANUFACTURE OF GAS.

No. 438,013. Patented Oct. 7, 1890.

(No Model.) 2 Sheets—Sheet 2.

B. LOOMIS.
PROCESS OF AND APPARATUS FOR THE MANUFACTURE OF GAS.

No. 438,013. Patented Oct. 7, 1890.

UNITED STATES PATENT OFFICE.

BURDETT LOOMIS, OF HARTFORD, CONNECTICUT.

PROCESS OF AND APPARATUS FOR THE MANUFACTURE OF GAS.

SPECIFICATION forming part of Letters Patent No. 438,013, dated October 7, 1890.

Application filed June 5, 1890. Serial No. 354,342. (No model.)

*To all whom it may concern:*

Be it known that I, BURDETT LOOMIS, a citizen of the United States, residing at Hartford, in the county of Hartford and State of Connecticut, have invented certain new and useful Improvements in the Process of and Apparatus for the Manufacture of Gas; and I do hereby declare the following to be a full, clear, and exact description of the invention, such as will enable others skilled in the art to which it appertains to make and use the same.

This invention relates to the manufacture of illuminating-gas or a high-grade fuel-gas from hydrocarbon oil and steam in a single generating-furnace by means of downdraft or exhaustion of the steam and hydrocarbon vapors down through a body of fuel heated to the proper temperature for decomposing steam and converting hydrocarbon vapors into fixed gas.

The object of my invention is to produce a fair quality of illuminating-gas or a high-grade heating-gas by a very simple operation in a single generating-furnace and to insure the complete decomposition of the steam and conversion of the hydrocarbons into fixed gas by drawing them with the exhauster down through the heated fuel.

Another object is to provide a conveniently arranged and connected apparatus for most economically carrying out my process.

According to patents heretofore granted to me air was drawn down through the body of fuel, causing its combustion with the generation of producer gas, and tarry vapors distilled from the coal were at the same time drawn down through the heated fuel and the resulting mixed gas drawn off at the bottom. Steam, together with air and tarry vapors, was also drawn down through the fuel, resulting in both instances in the production of a mixed gas containing nitrogen. In such operation also the tarry or hydrocarbon vapors were subjected to an injuriously-high temperature and were apt to be destructively decomposed and burned by means of the accompanying air introduced for maintaining the combustion of the fuel.

In my present process I exclude the air during the generation of gas from hydrocarbon oil or from oil and steam, so as to obtain a product not contaminated with nitrogen, and I still avail myself of the advantages of exhausting or drawing the gas from the base of the generator, thus causing the hydrocarbon vapors as generated to pass down through the bed of heated fuel, and thereby insure their conversion into fixed gas.

A suitable apparatus for carrying out my process is illustrated in the accompanying drawings, in which—

Figure 2:
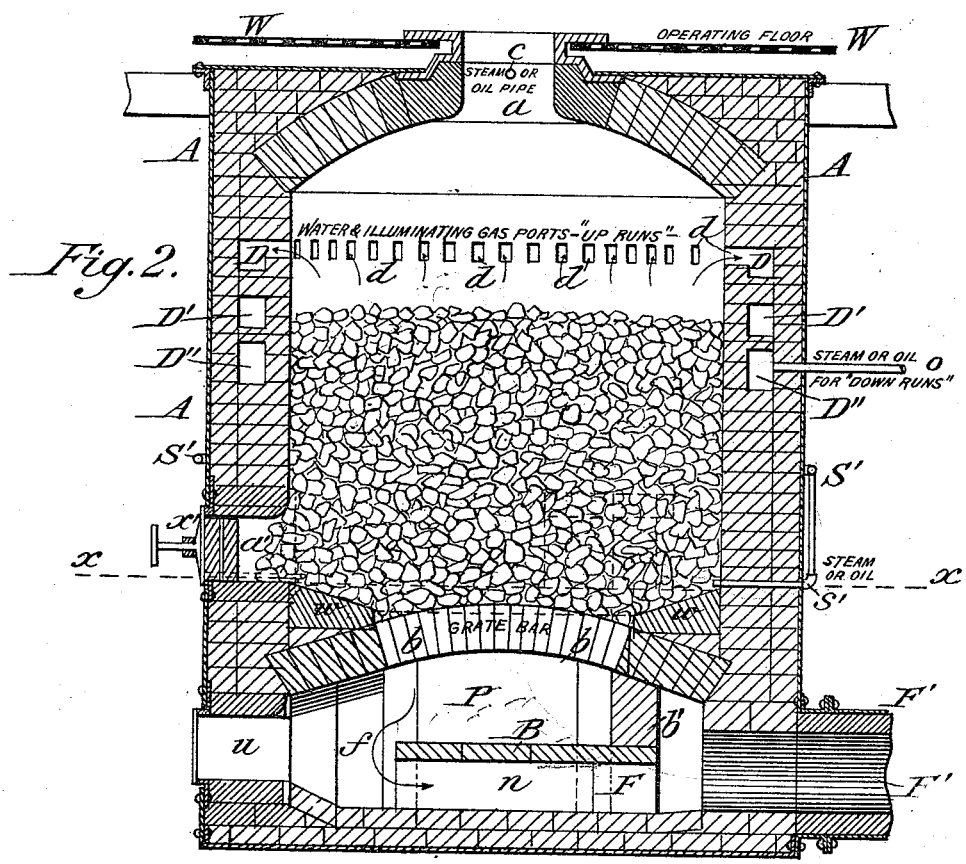
Figure 3:
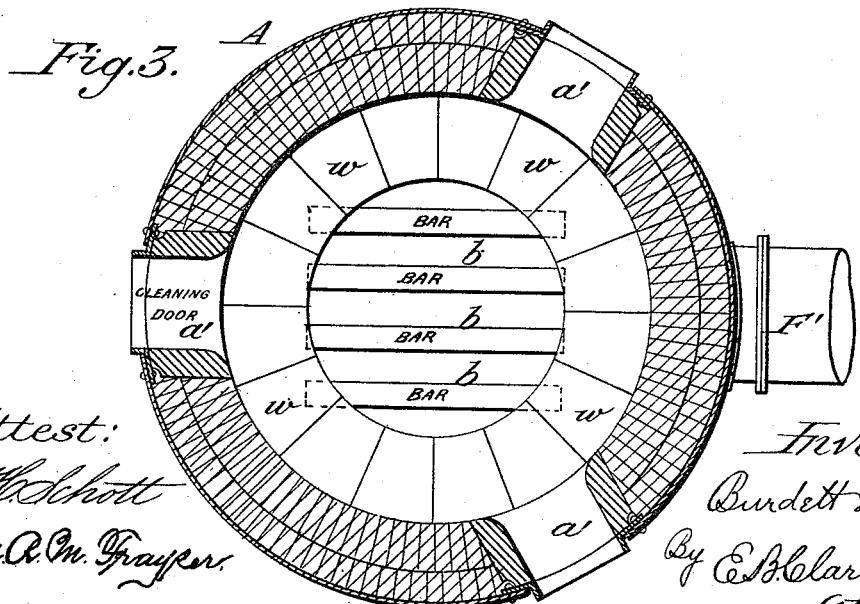

Figure 1 represents an elevation of the generator, boiler, or gas-cooler, exhauster, and suitable connecting-pipes and valves. Fig. 2 represents a vertical section of the gas-generating furnace. Fig. 3 represents a horizontal section thereof on the line $x\ x$ above the grate.

The generating-furnace A is constructed in the usual manner of brick and inclosed within a tight iron jacket, being provided at the top with a fuel-opening $a$, having a tight-fitting lid $x$. The bottom of the fuel-chamber above the grate is formed with a solid annular hearth $w$, inclined and extending inward from the outer walls and having a large central opening for the grate, which, as shown, is composed of brick arches $b$, extending transversely over the ash-pit and supported in the side walls. The ash-pit P is of about the same horizontal dimensions as the grate-opening, and has a brick or tile floor B, which is supported upon parallel division-walls or tile $n$, arranged in the wide outlet-flue F in the base of the furnace. A lateral transverse wall $b'$ separates ash-pit P from the opening of the take-off pipe F'. A passage-way $f$ leads from ash-pit P to the outlet-flue F. The tiles $n$ are set parallel and a short distance apart, so as to form an extended surface which is heated by the outgoing gases, and the heat of which may be utilized for superheating steam when it is passed upward through the fuel. Three openings $a'$ are formed in the walls just above the hearth and are provided with tight-fitting lids or doors $x'$. An ash-pit opening $u$ is formed below the grate, and in practice is provided with a tight-fitting door. The take-off pipe F' is preferably lined with fire-brick and connects with the base $h$ of the vertical tubular boiler H.

In the wall of the generator, preferably above its middle portion, I form a number of connecting annular flues—such as D D' D"— and connect the upper flue D with the interior of the generator by means of numerous ports $d$, as shown in Fig. 2. The number of annular flues may be increased, if desired.

A supply-pipe $o$ for steam or oil connects with the lower flue $D''$, and a separate supply-pipe $c$ for steam or oil opens into the passage-way $a$ at the top of the generator. A supply-pipe $S'$ encircles the generator and connects with it just above the hearth $w$ by branch pipes $s'$, through which pipe and its branches may be supplied either steam or oil. The main steam-supply pipe S may lead from the top of the boiler H or from any other boiler, and is provided with a controlling-valve $t$. The various steam-pipes connecting with the generator will be supplied by this main pipe S. A branch pipe $s''$ leads from it by connection (not here shown) into the take-off pipe $F'$, connecting with the base of the generator.

The tubular boiler and gas-cooler H is constructed with tube-sheets near the top and bottom and has at each end a smoke-box between each tube-sheet and each head of the boiler. The usual tubes are set in the tube-sheets at top and bottom and connect the smoke-boxes and serve for the passage of gas which is drawn off from the generator. Water is circulated in the shell H around the tube for cooling the gas, and the supply of water may be so controlled that steam will be generated by the outgoing hot gas. A gas take-off pipe I connects with the upper smoke-box of the boiler and with the exhauster T. A large escape-pipe J leads downward from the exhauster and connects with the main $J'$ for producer gas. Just below the exhauster a smoke-escape pipe Y connects with pipe J and extends upward to the open air, being provided near the top with a blow-off valve $y$, for permitting the escape of smoke or other waste products when first kindling the fire or when first starting to heat up the body of fuel. A branch pipe K, having valve $k$, also connects with pipe J below the blower and with the main $K'$ for illuminating-gas. Below the connections of pipe K and Y the pipe J is provided with a valve $j$. By means of the pipes J, K, and Y and their valves the flow of the different kinds of gas is readily controlled.

An outlet-pipe E (shown in Fig. 1) may connect with the annular flue D and extend into the seal-box G for taking off water-gas when steam is passed up through the generator. An escape-pipe $E''$ for water-gas leads from seal-box G. A small overflow-pipe $g$ leads from the side of the seal-box at the proper height for maintaining the water-level and extends into a well below. An engine $z$ is provided for running the Root exhauster. An iron floor W is supported on I-beams above the top of the generator and serves to support the exhauster and engine, also to permit the workman to supply coal to the generator and to work the different valves of the steam, oil, and gas pipes, the handles of which are arranged in convenient position above the floor.

In order to generate gas, a fire is first kindled on the grate and supplied with fuel until a deep body of ignited fuel is formed, the fire being allowed to burn at first by a natural draft, and the lid $x$ of passage $a$ at the top of the generator being opened. After a sufficient body of fuel has been ignited and the valves $j$ and $k$ being closed the blow-off valve $y$ in pipe Y is opened and the exhauster is started, drawing air down into the fuel, and the resulting gaseous products are blown out through pipe Y. After a sufficient depth of fuel has been supplied to the generator and combustible producer gas is generated valve $y$ is closed and valve $j$ is opened, permitting the producer gas to flow through the main $J'$ either to a holder or directly to a furnace for combustion. Bituminous coal in the form of lime or slack is gradually fed in until it nearly fills the furnace, and the exhauster is kept running so long as it is desired to generate producer gas. The hot gas passing off from the base of the generator heats the brick-work in the ash-pit and outlet-flue F and is cooled in passing through the tubular cooler H, so that it will not injure the exhauster in passing through it. A deep body of incandescent coal having been formed, heating or illuminating gas may then be generated as follows: Lid $x$ and valves $j$ and $y$ are closed, while valve $k$ is opened and the exhauster is kept running. Steam is now preferably admitted by pipe $o$ into the annular flue $D''$ and is successively passed through flues $D''$, $D'$, and D, in which it is superheated, and then passes out through ports $d$ into the body of fuel. By the operation of the exhauster it is drawn down into the fuel, where it is decomposed, and the resulting water-gas is conducted from the base of the generator through the tubular cooler into the main K K'. Steam may thus be passed for a short time alone through the fuel till its extremely high heat is reduced to a suitable temperature for generating carbureted hydrogen without undue waste by destructive decomposition. The first effect of the steam is to somewhat deaden the heat at the surfaces of the lumps of coal, while the interiors thereof still remain at a lively red heat. Soon after the first admission of steam hydrocarbon oil is admitted by pipe $c$ at the top of the generator or by pipes $S' s'$ above the hearth $w$.

In practice the oil is to be forced in by a pump or other pressure, or may be blown in by a steam-jet. Should the temperature at first be too high for the passage of the hydrocarbon vapor through the whole body of fuel, the oil is preferably admitted into the lower portion of the fuel. Then as the temperature of the fuel becomes reduced to the proper degree oil is admitted at the top. After starting the supply of oil the admission of steam is continued preferably through the superheating-flues in the wall, and the steam and oil are decomposed and converted into gas together in the body of fuel. The resulting water-gas and carbureted hydrogen are continuously drawn down through the body of fuel and away from the base of the generator by the exhauster and forced by it into the mains K K', and thence into the seal-box, from which they pass in the usual manner through the scrubber and purifier to the holder.

The quality or candle-power of gas will be determined by the proportions of steam and oil admitted to the generator. In case a rich gas for illuminating purposes is desired the proportion of oil will be increased; but in case a heating-gas is desired the proportion of oil will be diminished. I have found that a heating gas of good quality can be produced by supplying one gallon of oil for each one thousand (1,000) feet of water-gas manufactured. This amount of oil gives a gas of strong odor, so that it may be safely used for domestic or other purposes, and also greatly increases its value as a heating-gas.

In practice the larger proportion of steam is preferably admitted to the generator during the first part of the run, when the fuel is the hottest, and is gradually decreased toward the end of the run, while the larger proportion of oil is preferably admitted after the temperature has been lowered by the admission of steam and when the carbureted hydrogen gas can be generated without destructive decomposition and conversion into lampblack. The proper time and regulation of the oil-supply will be readily determined by observation of the fuel through sight-holes and by means of a burner supplied by the gas as generated.

By means of my process the oil vapors are subjected to a sufficient extent of heated surfaces to insure their complete conversion into fixed gas; but the carbureted hydrogen is quickly drawn away from the heated surfaces, so that it will not be destructively decomposed. This is very important in order to secure the most economical and satisfactory results.

In operating the generator steam is preferably only passed down through the fuel, so that the exhauster may be kept running and the operation simplified as much as possible, and for the purpose of conducting the above process the outlet-pipe E, seal-box G, and main E'' may be omitted. When the temperature of the generator and fuel is too much reduced for effectively converting steam and oil into fixed gas, both are shut off, valve $j$ is opened, and valve $k$ closed, and lid $x$ at the top of the generator is opened, permitting air to enter the generator and again heat up the body of fuel by combustion to the proper temperature for again generating water-gas and carbureted hydrogen. During the admission of air the exhauster is kept running, and the resulting producer gas is passed off through main J' to the holder or to a furnace for immediate use.

Powdered asphaltum, rich coal, or other material rich in hydrocarbon may be supplied to the generator for conversion into carbureted-hydrogen gas.

I have ascertained by experiment that better results may be secured by admitting the steam and oil separately, and therefore preferably pass the steam through the annular superheating-flues, and thence into the generator, while the oil is dropped in from the top or is supplied at any other convenient point to the body of fuel. Oil may also be admitted by pipe $o$ into the superheating-flue D'' and vaporized by passage through the flues above and the vapors passed through ports $d$ into the fuel-chamber for conversion into carbureted hydrogen by passage down through the fuel, the resulting gas being drawn off by the exhauster.

Having described my invention, what I claim, and desire to secure by Letters Patent, is—

1. The process of manufacturing gas, which consists in heating a body of fuel to incandescence by combustion with air, then excluding the air and admitting steam and oil to the generating-chamber, causing the oil to be vaporized, drawing the steam and oil vapors down into the heated fuel, causing their conversion into fixed gas, and drawing such gas away by exhaustion from the base of the generator.

2. A downdraft gas-generating furnace having supply-pipes for steam and oil connecting with its fuel-chamber and a gas-outlet pipe leading from its base, in combination with an exhauster connecting with such gas-outlet pipe, a main pipe leading from the exhauster to a main for producer gas and provided with a controlling-valve, a smoke-escape pipe provided with a blow-off valve connecting with the main pipe between its valve and the exhauster, and a pipe for illuminating-gas, provided with a valve and also connecting with the main pipe between its valve and the exhauster, substantially as and for the purpose described.

3. In combination with a downdraft gas-generating furnace, two or more connected annular flues arranged in its walls and opening by ports into the furnace, a supply-pipe for steam or oil connecting with one of the flues, a supply-pipe for steam or oil connecting with the top of the furnace, a gas-outlet pipe leading from the base of the generator, a connected gas-cooler, an exhauster connected with the cooler, and suitable valved discharge-pipes for waste products, producer gas, and illuminating-gas connecting with the exhauster, substantially as described.

In testimony whereof I affix my signature in presence of two witnesses.

BURDETT LOOMIS.

Witnesses:
THOMAS M. SMITH,
GRACE L. LOOMIS.